J. G. WOLFE.
LOCK NUT.
APPLICATION FILED DEC. 9, 1910.
1,005,678.
Patented Oct. 10, 1911.
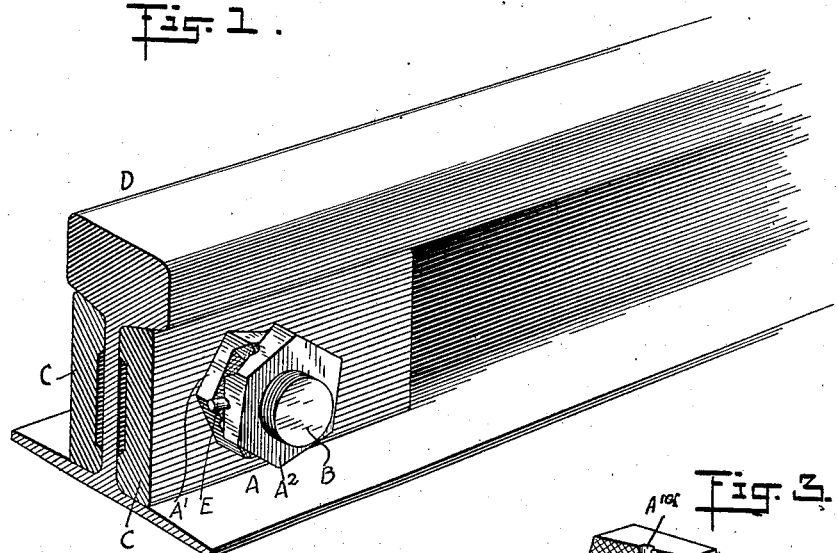
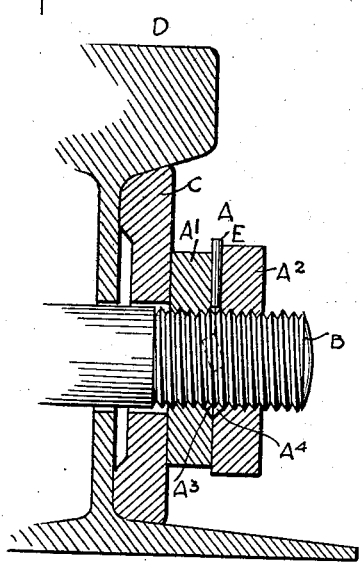
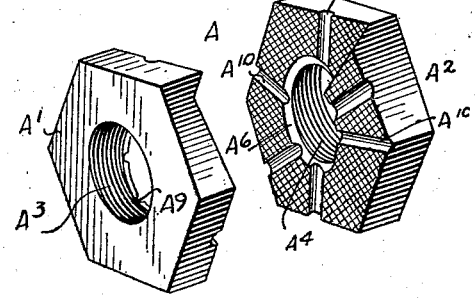
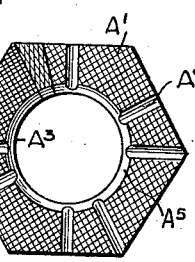
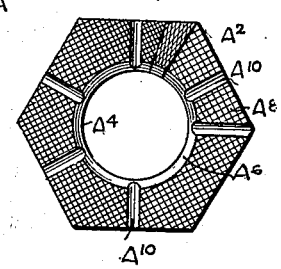
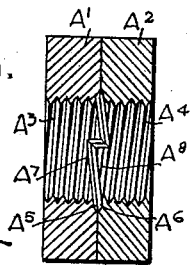
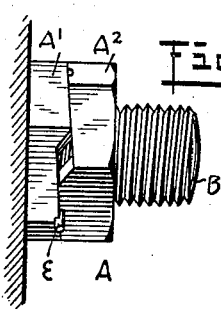
WITNESSES
INVENTOR
John G. Wolfe
BY
ATTORNEYS

UNITED STATES PATENT OFFICE.

JOHN GEORGE WOLFE, OF NEW YORK, N. Y.

LOCK-NUT.

1,005,678.  Specification of Letters Patent. Patented Oct. 10, 1911.

Application filed December 9, 1910. Serial No. 596,447.

*To all whom it may concern:*

Be it known that I, JOHN G. WOLFE, a citizen of the United States, and a resident of the city of New York, borough of Manhattan, in the county and State of New York, have invented a new and Improved Lock-Nut, of which the following is a full, clear, and exact description.

The object of the invention is to provide a new and improved lock nut, arranged to permit of conveniently locking the nut in place at any desired point along the bolt with a view to prevent accidental unscrewing of the nut. For the purpose mentioned the nut is made in sections and the opposite faces of the sections are provided with cam surfaces for pressing the sections away from each other against the threads of the bolts to lock the nut in place at any desired point along the bolt, and means for locking the nut sections together to prevent the same from turning.

A practical embodiment of the invention is represented in the accompanying drawings forming a part of this specification, in which similar characters of reference indicate corresponding parts in all the views.

Figure 1 is a perspective view of the lock nut as applied to a bolt for holding the fish plates in position on the rail, the latter and the fish plates being shown in cross section; Fig. 2 is an enlarged cross section of the same; Fig. 3 is a perspective view of the nut with the nut sections disassembled; Fig. 4 and Fig. 5 are face views of the nut sections; Fig. 6 is a cross section of the nut with the sections assembled; and fig. 7 is a side elevation of the nut as applied to a bolt having a left-hand thread.

The nut A, as illustrated in Figs. 1, 2 and 7, screws on a bolt B employed for fastening the fish plate C on the rail D, but it is expressly understood that I do not limit myself to this particular application of the nut and bolt. The nut A is made in two sections $A'$ and $A^2$, provided with threads $A^3$ and $A^4$, each extending from the outer face of the nut to a countersunk portion $A^5$ or $A^6$ on the inner face of the corresponding nut section $A^3$ or $A^4$. The opposite faces of the sections $A'$ and $A^2$ of the nut are formed into cams $A^7$ and $A^8$, preferably in the form of ratchet teeth in register with each other when the sections $A'$ and $A^2$ are assembled, so as to render the threads $A^3$, $A^4$ practically continuous and allow of screwing the nut on the bolt B. When the nut A has been screwed up to the desired position, then the outer section $A^2$ is turned in the reverse direction so that the cams $A^7$ and $A^8$ glide one over the other to force the nut sections $A'$ and $A^2$ in opposite directions, thereby jamming the nut sections $A'$ and $A^2$ against the threads of the bolt B and locking the nut in position on the bolt B.

The nut sections $A'$ and $A^2$ are provided at the cam faces with radially-disposed recesses $A^9$ and $A^{10}$, arranged in such a manner that when the outer nut section $A^2$ is turned in the reverse direction, as above described, then some of the said recesses $A^9$ and $A^{10}$ move in register with each other, and a plug E is now placed in the hole formed by the registering recesses (see Fig. 2) to lock the nut sections $A'$, $A^2$ against accidental turning by jars, vibrations or the like on the rail D. The recesses $A^9$ and $A^{10}$ are staggered relative to each other to permit of locking the nut sections together at almost any point of their relative position. By providing the nut sections $A'$ and $A^2$ with the countersinks $A^5$ and $A^6$ the threads $A^3$, $A^4$ present no burs or like projections and hence the cam faces fit snugly one on the other. It is understood that the inner ends of the threads $A^3$, $A^4$ gradually merge into the countersinks and hence no sharp burs are produced when forming the threads in making the nut but the threads are formed when the nut sections $A'$, $A^2$ are assembled as shown in Fig. 6, so that the thread in the nut section readily engages the thread on the bolt when screwing the nut up on the bolt as before explained. It will also be noticed that when the nut section $A^2$ is turned backward the bolt thread is not injured as the inner face is smooth and free of burs. In case it is desired to unscrew the nut A, it is only necessary to turn the outer section $A^2$ in the reverse direction until the cams $A^7$ and $A^8$ are again in complete register with each other, and then the nut can be unscrewed from the bolt B.

In case the nut A is for a bolt B with left-hand threads, as indicated in Fig. 7, the nut is the same, with the exception of a continuous thread to screw on the bolt B, but in this case the outer section $A^2$ of the nut, after the latter is screwed up to the desired position, is turned in the same direction as the entire nut on screwing the same up, so that the cams A⁷ and A⁸ move the sections A′ and A² apart, thus jamming the sections on the threads of the bolt B to lock the nut in place. It is understood that in either case the inclination of the cams A⁷ and A⁸ is different from the pitch of the threads A³, A⁴, that is, is preferably in excess of the pitch, as will be readily understood by reference to Fig. 6.

Although I have shown a hexagon nut formed in two sections having one ratchet tooth on each face, it is evident I do not limit myself to this particular form of nut or to the number of teeth mentioned, as the same may be varied without deviating from the spirit of my invention.

Having thus described my invention, I claim as new and desire to secure by Letters Patent:

1. A lock nut made in sections and having a continuous internal thread, the sections having ratchet teeth at their opposite contacting faces, the inclination of the ratchet teeth being different from the pitch of the thread, the said nut sections having radial recesses on the contacting faces the recesses being staggered relatively to each other, and a plug engaging the said recesses when in registry.

2. A lock nut made in sections and having a continuous internal thread, the sections having faces adapted to lock together and also having radially disposed recesses staggered relatively to each other, and a fastening member to be driven into said recesses when the latter are in registry.

3. A lock nut made in sections and having a continuous internal thread, said sections having ratchet teeth upon their contacting faces, the inclination of the ratchet teeth being different from the pitch of the thread, each section being provided with a number of radially disposed recesses, each having generally a semi-cylindrical form, said recesses being staggered, and a cylindrical plug to be driven into a recess carried by one section and another recess carried by the other section when said last mentioned recesses are in registry.

4. A lock nut made in sections and having a continuous internal thread, the sections having ratchet teeth upon their oppsite contacting faces, the inclination of the ratchet teeth being different from the pitch of the thread and means for holding one of said sections relatively to the other independently of the relative positions of the ratchet teeth carried by the two sections.

In testimony whereof I have signed my name to this specification in the presence of two subscribing witnesses.

JOHN GEORGE WOLFE.

Witnesses:
 THEO. G. HOSTER,
 PHILIP D. ROLLHAUS.

---

Copies of this patent may be obtained for five cents each, by addressing the "Commissioner of Patents, Washington, D. C."